United States Patent [19]

Sugimori et al.

[11] Patent Number: 4,516,715

[45] Date of Patent: May 14, 1985

[54] VACUUM CONTAINER OF RADIATION IMAGE MULTIPLIER TUBE AND METHOD OF MANUFACTURING THE SAME

[75] Inventors: Fumio Sugimori, Yokohama; Chikae Nishino, Sagamihara; Norio Harao, Ayase, all of Japan

[73] Assignee: Tokyo Shibaura Denki Kabushiki Kaisha, Japan

[21] Appl. No.: 467,918

[22] Filed: Feb. 18, 1983

Related U.S. Application Data

[62] Division of Ser. No. 260,399, May 4, 1981, Pat. No. 4,423,351.

[30] Foreign Application Priority Data

May 6, 1980 [JP] Japan .................................. 55-59710
May 29, 1980 [JP] Japan .................................. 55-70760

[51] Int. Cl.³ .......................... H01J 9/26; B23K 20/02

[52] U.S. Cl. .................................... 228/208; 228/234; 228/263.16; 445/44

[58] Field of Search ................... 228/263.16, 208, 209, 228/210, 235, 243, 116, 234; 445/44

[56] References Cited

U.S. PATENT DOCUMENTS

| | | | |
|---|---|---|---|
| 3,078,563 | 2/1963 | Gould et al. | 228/208 |
| 3,292,256 | 12/1966 | Morgan | 228/243 X |
| 4,122,967 | 10/1978 | Rohrich | 313/420 X |
| 4,153,854 | 5/1979 | Christgau et al. | 313/525 |
| 4,238,043 | 12/1980 | Minami et al. | 313/527 |

FOREIGN PATENT DOCUMENTS

| | | |
|---|---|---|
| 0002419 | 6/1979 | European Pat. Off. . |
| 0023051 | 1/1981 | European Pat. Off. . |
| 7711074 | 11/1977 | France . |
| 520365 | 4/1940 | United Kingdom . |
| 545023 | 5/1942 | United Kingdom . |
| 1008021 | 10/1965 | United Kingdom . |

*Primary Examiner*—Kenneth J. Ramsey
*Attorney, Agent, or Firm*—Cushman, Darby & Cushman

[57] ABSTRACT

A vacuum container of a radiation image multiplier tube is disclosed, which is provided with a radiation input window made of Al or an Al alloy and an output portion made of a glass or ceramic insulator for outputting radiation image multiplied signals. Between the input window and the output portion is interposed a ring made of Fe or an Fe alloy, and an airtight joint between the ring of the input window is effected by hot pressure-bonding through a thin layer of Ni, Cu or Al. A method of manufacturing the vacuum container by means of such hot pressure-bonding is also disclosed.

4 Claims, 13 Drawing Figures

VACUUM CONTAINER OF RADIATION IMAGE MULTIPLIER TUBE AND METHOD OF MANUFACTURING THE SAME

This is a division of application Ser. No. 260,399 filed May 4, 1981, now U.S. Pat. No. 4,423,351.

The present invention relates to a radidation image multiplier tube such as an X-ray fluorescence multiplier tube for multiplying and reproducing images of a specimen to be tested by utilizing X-rays, γ-rays or other equivalent radiation, particularly to the structure of a vaccum container thereof, and to a method of manufacturing the same.

In X-ray fluorescence multiplier tubes, for example, attempts have been made to form the X-ray input window constituting a portion of the vacuum container from Al (aluminum) or an Al alloy (hereinafter referred to as "Al material") which is comparatively high in mechanical strength, superior in X-ray permeability and low in X-ray scattering, in place of glass which causes problems with X-ray scattering, decreases the quality of the image and so on. The output portion of the vacuum container should be composed of glass or a ceramic insulator in order to prevent an accelerating electrode from discharging to the outside and to guide the image multiplied signals such as visible rays or electrical signals converted in the inside of the tube to the outside. As is well known, it is not easy to effect a direct airtight joint either between glass and an Al material or between ceramic and an Al material, and a technique for a stable airtight joint between these materials providing in radiation image multiplier tubes having a relatively wide diameter has not been completed yet. Thus, it is practically desirable to provide an airtight joint at the Al material through an intermediate cylinder made of Fe or an Fe alloy such as an Fe-Ni-Co alloy known as "Kovar", which are capable of forming a stable airtight joint with glass and ceramic. It is a question of how to form the airtight joint between the Al material and the Fe or Fe alloy (hereinafter referred to as "Fe material") in this construction. U.S. Pat. No. 4,153,854 discloses a technique for effecting the airtight joint between the Al material and the Fe material in the vacuum container, by interposing a thin layer of Ag or of Ni and Ag therebetween by means of metal plating or deposition procedures and then forming a diffusion junction by applying heat and pressure thereto. Japanese Laid-open patent application No. 138,861/1977 discloses a technique which involves plating Sn and Cu or Au between the Al material and the Fe material and forming an eutectic junction. Japanese Utility Model publication No. 25,810/1974 discloses a technique which involves forming Ni plated layers on the surfaces of both of the materials or effecting arc welding through a thin Ni layer therebetween. Although the known techniques of forming a diffusion junction or eutectic junction are effective solutions, they are inexpedient for industrial mass production because of the high price of raw materials and require improvements with respect to mechanical joint strength. The procedures based on welding and the duffusion junction present problems in that they cannot provide sufficient joint strength where diffusion between different metals is insufficient, and a brittle intermetallic compound is likely to be formed when the degree of diffusion is excessive, so these procedures are not widely adopted.

The present invention was made under circumstances as hereinabove set forth, and the object of the present invention is to provide a radiation image multiplier tube vacuum container having an airtight junction which is extremely stable, has sufficient strength, and is formed by applying heat and pressure to one or more plated or deposited layers of Ni, Cu or Al, interposed between Al and Fe materials, and which is relatively suitable for mass production; and to provide a method of manufacturing the vacuum container in an easier and more stable manner.

The present invention provides a vacuum container for a radiation image multiplier tube comprising a cylindrical body, a radiation input window of Al or an Al alloy provided at one end of the body and a glass or ceramic insulator member provided at the other end of the body with a portion thereof being employed as an output portion for outputting radiation image multiplied signals; characterized in that a first ring made of Fe or an Fe alloy constituting a portion of the cylindrical body is airtightly connected between the radiation input window and the insulator member with or without the interposition of a second ring made of Al or an Al alloy, and an airtight junction between the first ring and the input window or the second ring is formed by hot pressure-bonding with one or more thin layers of a metal selected from the group consisting of Ni, Cu and Al interposed therebetween.

The present invention also provides a method of manufacturing a vacuum container for a radiation image multiplier tube in which Al or an Al alloy member constituting a radiation input window is airtightly joined to a glass or ceramic insulator member constituting an output portion for outputting radiation image multiplied signals through a first ring made of Fe or an Fe alloy, characterized in that, in bonding the first ring with the member of Al or Al alloy, one or more thin layers of a metal selected from the group consisting of Ni, Cu and Al are previously formed by metal plating or deposition on a portion to be joined of the member of Al or Al alloy and/or a portion to be joined of the first ring, are superposed in planes perpendicular to the axis of the tube and are airtightly joined by hot pressure-bonding while applying pressure in the direction of the tube axis by means of a press apparatus.

This invention can be more fully understood from the following detailed description when taken in conjunction with the accompanying drawings, in which.

The X-ray image intensifier tubes will be described by way of examples with reference to the drawings, in which the same parts are indicated by the same reference numerals.

Figure 1:
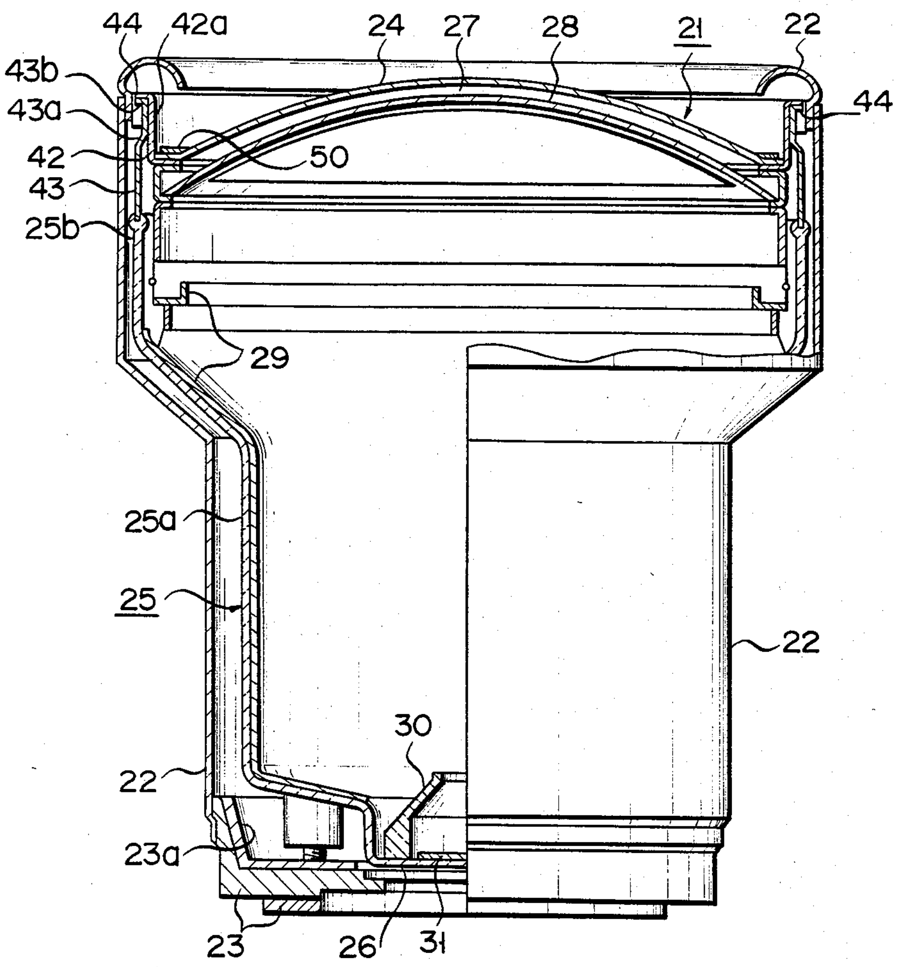
FIG. 1 is a partial sectional view illustrating a vacuum container for a radiation image multiplier tube according to an embodiment of the present invention.
Figure 2:
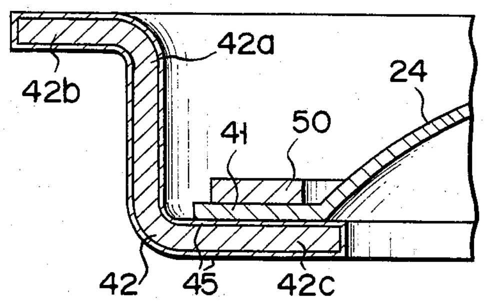
FIG. 2 is an enlarged sectional view illustrating the essential portion of the embodiment of FIG. 1.

The embodiments shown in FIGS. 1 to 4 have the following constructions. An X-ray fluorescence multiplier tube 21, as shown in FIG. 1, is accommodated in a camera lens mounting table 23 lined with a magnetic shield cylinder 22 and a lead plate 23*a*. A vacuum container comprises an X-ray input window 24, a body portion 25 composed of a glass cylinder with a bottom as a main part, and an output portion 26. Inside the container are disposed an input base plate 28 having an X-ray excited fluorescent layer and a photoelectric cathode surface 27, a grid 29, an anode 30 and an output fluorescent plate 31 in a predetermined positional relation in the order named from the top of FIG. 1. The input window 24 of the vacuum container is 0.5 to 2.0 mm thick and is composed of aluminum (Al) or an Al alloy (hereinafter referred to as "Al material") containing at least one of Si, Cu, Mn and Mg in an amount of about 0.5% or higher to increase the strength. The input window 24 may have a convex structure, being spherically curved toward the outside. Alternatively, it may be flat for a small and compact tube. The input window 24 has a peripheral portion 41 which lies in a plane perpendicular to the axis of the tube, and the peripheral portion 41 is joined airtightly to a intermediate metal ring 42 having a half section in the form of a crank by procedures as will be set forth hereinafter. A sealing ring 43 comprising a Kovar cylinder is airtightly welded to an open end portion 25*b* of a glass cylinder insulator 25*a* of the body portion 25, and the open end portion is provided with a flange 43*b* and a cylinder portion 43*a* capable of fitting with a cylinder portion 42*a* and the outer circumference of a flange 42*b*. In the assembly of the tube, the intermediate metal ring 42 joined airtightly and integrally to the outer periphery of the input window 24 is engaged with the sealing ring 43 made of Kovar which is joined integrally to the body 25 after the deposition of each of the electrodes. The end portions of the flanges 42*b* and 43*b* are airtightly welded over their peripheries with local heating by inert gas arc welding or the like. The sealed portion is indicated by reference numeral 44, and the welded portion is also utilized for fixing the tube 21 to the outer magnetic shield material 22. For the intermediate metal ring 42, a material easily weldable with the Kovar sealing ring 43, such as Fe, or an Fe alloy (hereinafter referred to as "Fe material"), e.g., Fe-Ni-Cr (stainless steel), Fe-Ni-Cu alloy (ferromagnetic materials such as Permalloy and the like) or Fe-Ni-Co alloy (Kovar), is employed, and a thickness of 0.5 to 2.0 mm is appropriate.

Figure 3:
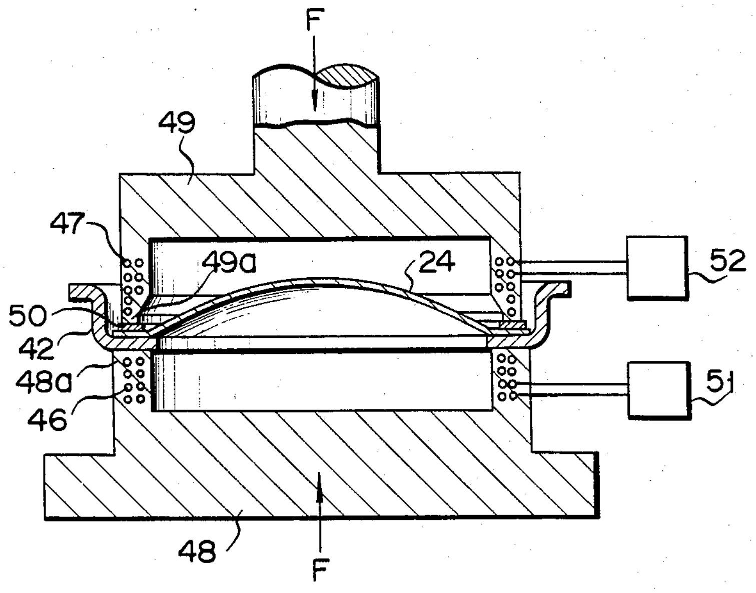
FIG. 3 is a sectional view illustrating a procedure for forming a junction.
Figure 4:
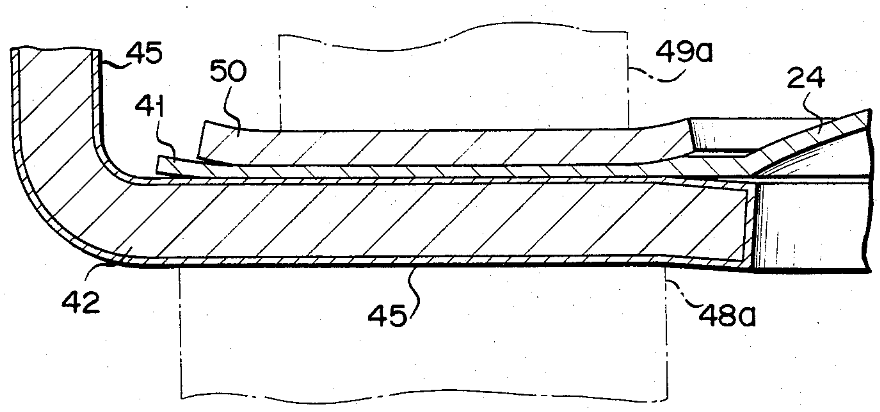
FIG. 4 is an enlarged sectional view illustrating the joint portion.

The formation of the airtight junction between the input window 24 of the Al material and the intermediate metal ring 42 of the Fe material will be explained by preferred manufacturing methods. The intermediate metal ring 42 is covered with a Ni plated layer 45 (see FIG. 2). The Ni plated layer may have a thickness of 100μ or less and, preferably, 10 to 50μ. As shown in FIGS. 3 and 4, sufficiently degreased and washed parts are disposed between a pair of lower and upper press apparatuses 48 and 49, respectively, containing heating heaters 46 and 47. The parts comprise a flat portion 42*c* of the intermediate metal ring 42 having the Ni plated layer, the peripheral portion 41 of the input window, and a washer ring 50 composed of a metal material such as an Fe material or a Ni material having a softening temperature higher than that of the Al material of the input window and having a thickness of 0.2 to 1.0 mm. These parts are superposed in the order named from the bottom as shown in the drawing. The parts are arranged in contact with each other in planes perpendicular to the axis of the tube. Ring tip portions 48*a* and 49*a* of the respective press apparatuses 48 and 49 are selected so as to equal in width to aritight junction, or slightly wider than the width of the lower side 48*a*. In this embodiment, the width of the tip portion 49*a* of the upper press apparatus is wider than that of the washer ring 50. The temperature is raised by applying heat to each of the press apparatuses through power sources 51 and 52. The press apparatuses are formed with a material having a superior hardness and heat resistance such as, for example, an Fe alloy. The temperatures of the tip portions 48*a* and 49*a* are raised so as to maintain a temperature of about 470° C. at the metals to be joined. This is accomplished by raising the temperature of the lower side 48*a* in contact with the intermediate metal ring 42, as in the drawing, to about 580° C., for example, relative to the upper side 49*a* at about 500° C. in contact with the Al material of the input window through the washer ring 50. The difference in temperatures can prevent overheating of the input window and subsequent deformation. At the same time, pressure is applied to the press apparatuses from the top and the bottom as shown by arrows (F), and the pressure is maintained for several minutes or more. Although the pressure (F) is controlled depending upon the temperature of the junction, it is desired to apply pressures of 1,000 kg/cm$^2$ at 470° C.

The procedures as mentioned hereinabove allow the intermediate metal ring 42 of the Fe material to be joined by heating and pressure to the input window of the Al material through the thin Ni layer 45, thereby providing an airtight junction. The section of the junction is shown in FIG. 4. It is to be noted that, in a range in which the tip portions 48*a* and 49*a* of the lower and upper press apparatuses, respectively, apply pressure, as indicated by the dashed line, the Al material of the input window 24 is compressed into a thin layer and strongly joined by pressure welding to the intermediate metal ring 42. The washer ring 50 also becomes attached to the Al material of the input window, although without airtightness. In this case, the washer ring 50 is not attached at all to the upper press apparatus 49*a*. Thus, the washer ring 50 assists the hot pressure-bonding of the Al material of the input window with the intermediate metal ring in an airtight manner, and serves to prevent attachement of the Al material to the press apparatus while controlling deformation because it reinforces the peripheral portion of the input window. Accordingly, the washer ring may be mounted as it is to a tube product or may be joined to the input window and the intermediate metal ring if it can be removed without damage to the airtight junction between them. In the latter case, the washer ring is removed after joining. As the washer ring has the functions as hereinabove set forth, it is preferably composed of a material that has a hardness similar to that of the material for the intermediate metal ring 42 or the press apparatus.

Figure 5:
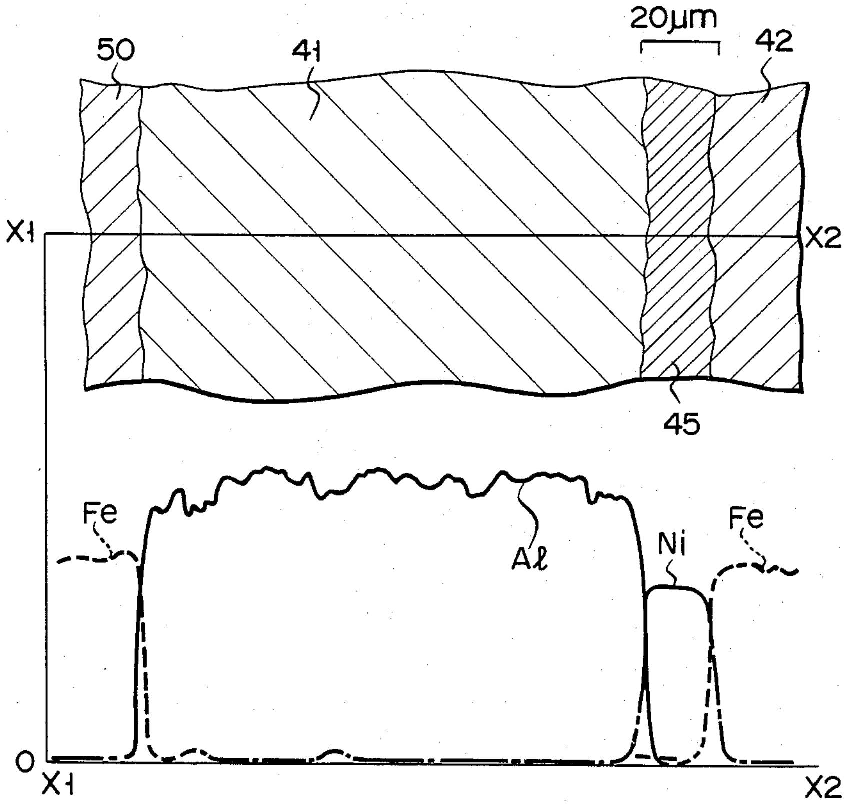
FIG. 5 shows the results of X-ray analysis of junction of Fe, Ni and Al at the joint portion.

FIG. 5 illustrates the results of analysis by means of an X-ray microanalyzer of the metal element profile of the sectional portion bonded by means of heat and pressure as mentioned hereinabove. In this figure, the abscissa in the characteristic pattern indicates the position along the line $X_1$–$X_2$ of the hot pressure bonded portion, and the ordinate indicates the measurement value. It was seen that the Fe, Ni and Al did not diffuse deeply within the other metal because the boundaries between them were relatively clear. Accordingly, the result indicates that there is not risk of forming brittle intermetallic compounds in a thick layer, and there is a physically and mechanically stable situation of welding by heating and pressure.

According to the embodiment mentioned hereinabove, the thin Ni layer 45 may be formed over the whole surface of the intermediate metal ring 42 so that it is easy to sufficiently control its thickness and adhesion strength. The airtight welding of the sealed portion at the position indicated by the reference numeral 44 may be effected in a sure and easy manner without any further processing so that it is extremely effective for industrial application, particularly in combination with the low price of materials to be employed for the metal plated layer. This facilitates the manufacture of the vacuum container because a thin metal layer is not necessarily formed on the input window composed of a relatively thin Al material. Furthermore, the vacuum container in accordance with the present invention is easy to handle because the input window is previously integrally joined to the intermediate metal ring. Thereafter, the radiation-excited fluorescent layer and the photoelectric cathode layer may be formed directly on the inner surface of the input window so that it is applicable to a construction in which the input base plate 28 as shown in FIG. 1 is omitted.

Figure 6:
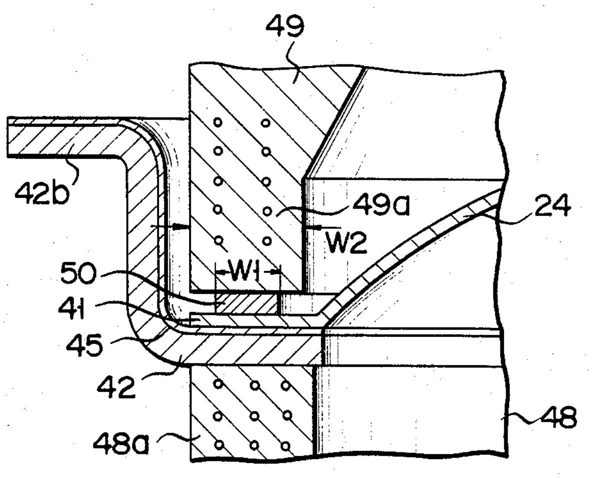
FIG. 6 is a sectional view illustrating the essential portion for explaining a manufacturing method in accordance with the present invention.

FIG. 6 illustrates an embodiment in which the width ($W_1$) in the radial direction of the washer ring 50 is smaller than the width ($W_2$) of the tip portion 49*a* of the upper press apparatus 49 mounted in contact therewith. This enables the range of the airtight junction between the input window 24 and the intermediate metal ring 42 to be equal to the width ($W_1$) of the washer ring 50. Thus, the width of the airtight junction may be controlled arbitrarily by choosing a desired width ($W_1$) of the washer ring 50.

Figure 7:
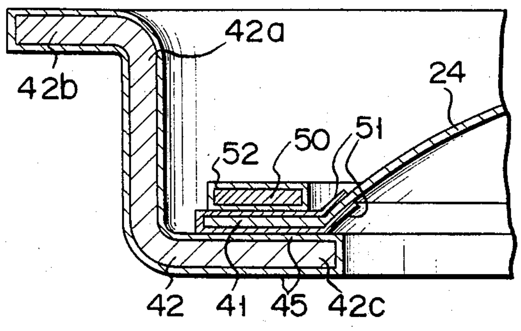
FIGS. 7 and 8 are sectional views illustrating joint portions according to other embodiments of the present invention.

FIG. 7 illustrates an embodiment in which the thin Ni plated layers 51 and 52, respectively, are formed on both surfaces of the peripheral portion 41 of the input window 24 and over the whole surface of the washer ring 50. The thin Ni plated thin layer 51 to be formed on the peripheral portion of the input window 24 is formed outside the effective input surface in order not to cause attenuation of the incident X-rays. The quality of hot pressure-bonding will be rendered higher by forming the Ni plated thin layers on the input window and the intermediate metal ring superposed parts in the manner as mentioned immediately hereinabove. As the same thin Ni plated layers may be employed, the manufacture is rendered easy and the airtight junction may be effected in a sure manner. As the washer ring can be strongly attached, the peripheral portion of the input window is further reinforced.

In the above embodiments, description has been made on the case where the thin metal layer to be interposed between the input window and the intermediate metal ring to be airtightly joined is composed of Ni; however, the metal to be employed for the thin metal layers is not restricted to Ni; a material as shown in Table 1 or a combination thereof may be employed to give a stable junction by applying heat and pressure.

TABLE 1

| Reference | Thin metal layer to be formed on surface of Al material of input window | Thin metal layer to be formed on surface of Fe material of intermediate metal ring |
|---|---|---|
| I | Cu plated layer | None |
| II | Cu plated layer | Cu plated layer |
| III | None | Cu plated layer |
| IV | Ni plated layer | None |
| V | None | Cu layer plated on Ni plated layer |
| VI | None | Al deposited layer |
| VII | None | Al layer deposited on Ni plated layer |
| VIII | None | Al layer deposited on Cu plated layer |

Appropriate temperatures and pressures of the junction portion during the bonding by heating and pressure include those as mentioned hereinbefore when the Ni plated layer is formed, and junction temperatures of 310° C. at a pressure of 960 $kg/cm_2$ and 500° C. at a pressure of 520 $kg/cm^2$ are appropriate when the Cu plated layer is formed. It is appropriate to apply a temperature ranging from 250° C. to 650° C., preferably from 350° to 500° C. and a pressure ranging from 250 to 1,500 $kg/cm_2$, preferably from 800 to 1100 $kg/cm^2$. When the Al deposited layer is employed, its thickness may by 300$\mu$ or less and, preferably, 1 to 2$\mu$.

Figure 8:
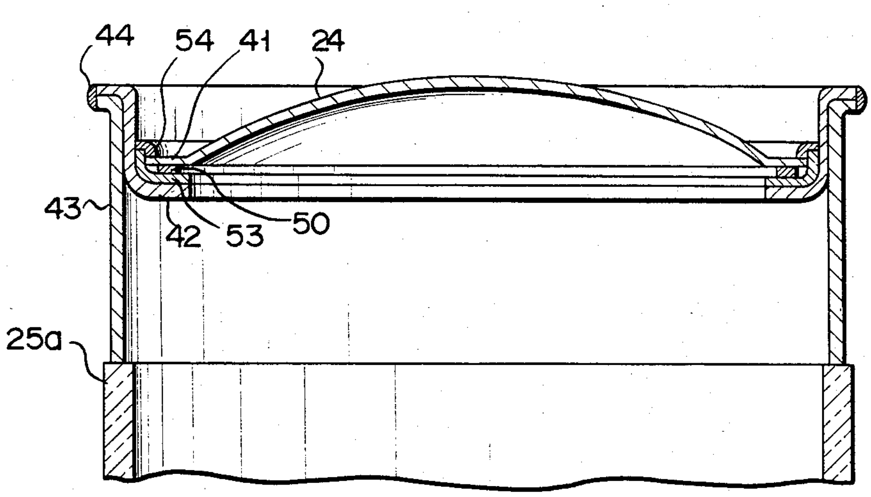
Figure 9:
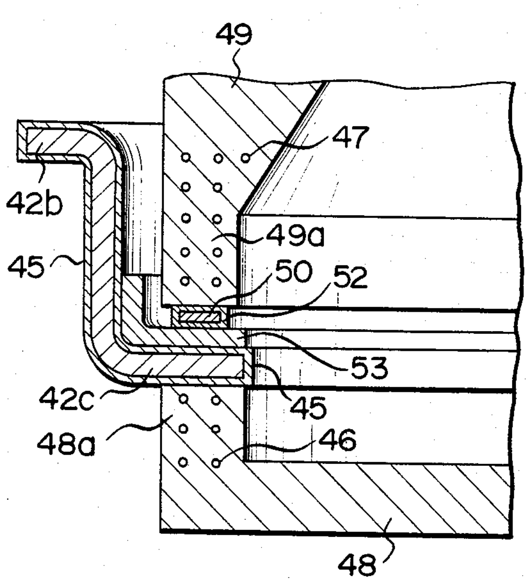
FIG. 9 is a sectional view illustrating the essential portion of another embodiment of the present invention.
Figure 10:
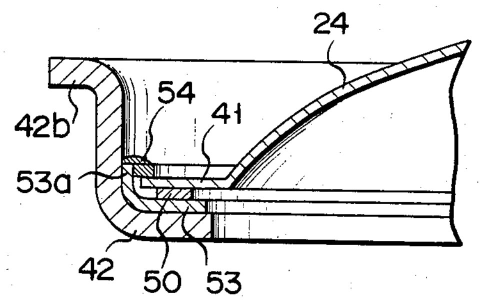
FIGS. 10 and 11 are sectional views illustrating the essential portions of other embodiments of the present invention.

The embodiments shown in FIGS. 8 to 10 have the following constructions. The intermediate metal ring 42 of Fe material having a half section in the form of a crank is provided with a thin Ni plated layer 45, and the inner flat portion 42*c* of the intermediate metal ring is provided with a intermediate Al ring 53 of Al material having a half section in an L-shaped form. The washer ring 50 with the Ni plated layer is mounted on the intermediate Al ring, disposed between the lower and upper press apparatuses 48 and 49, respectively, and joined by applying heat and pressure in the same manner as in the above embodiments. With the washer ring 50 disposed at the lower side, the peripheral portion 41 of the input window 24 fits inside the intermediate Al ring 53, and the peripheral portion and an upper end portion 53*a* of the intermediate Al ring 53 are welded airtightly over the whole periphery by a method such as AC-TIG welding. Reference numeral 54 in the drawing indicates a welded portion of Al material formed as a projection by the airtight welding.

This embodiment of the vacuum container has a construction in which the intermediate ring 53 of Al material and the intermediate metal ring 42 of Fe material are bonded by applying heat and pressure and then the intermediate ring 53 and the input window, both made of Al material, are welded. The washer ring 50 is employed for ensuring the hot pressure-bonding between the intermediate Al ring 53 and the intermediate metal ring 42 of Fe material. As the airtight welding between the intermediate ring and the input window, both made of Al material, is effected easily, it is effective to prevent deformation of the input window.

Figure 11:
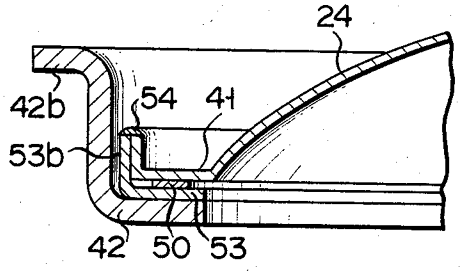

FIG. 11 illustrates an embodiment in which an outer side surface 53*b* of the intermediate Al ring 53 having a half section in an L-shaped form is arranged slightly separated from the inner side surface of the intermediate metal ring 42 of Fe material. The outermost periphery of the peripheral portion 41 of the input window 24 is folded parallel to the axis of the tube and along the end portion 53*a* of the intermediate Al ring 53, thereby airtightly welding the whole periphery of the two portions as shown by reference numeral 54. As the welded portion 54 is provided separately from the inner side surface of the intermediate metal ring 42, the welding can be performed easily and the airtight welding to the input window can be conducted with only a local rise in temperature. Thus, deformation of the input window can be controlled.

Figure 12:
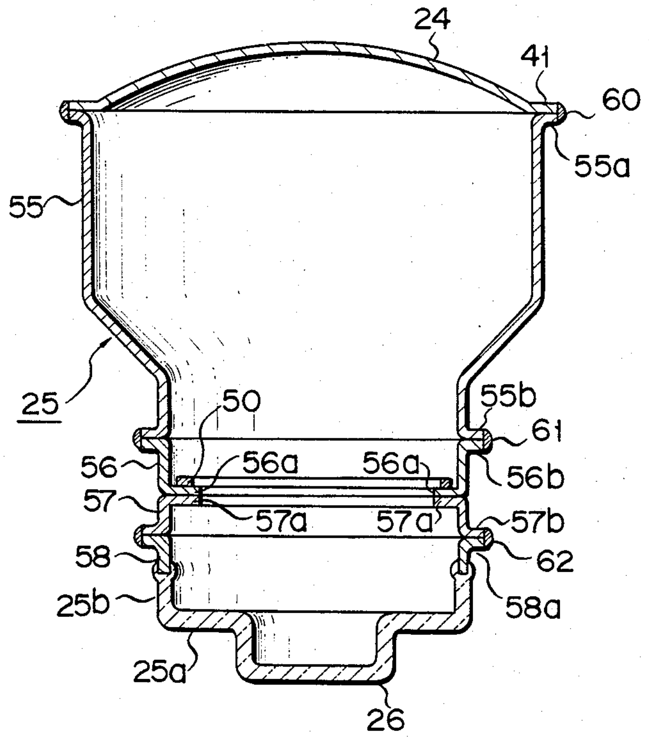
FIG. 12 is a sectional view illustrating a vacuum container for a radiation image multiplier tube in accordance with another embodiment of the present invention.
Figure 13:
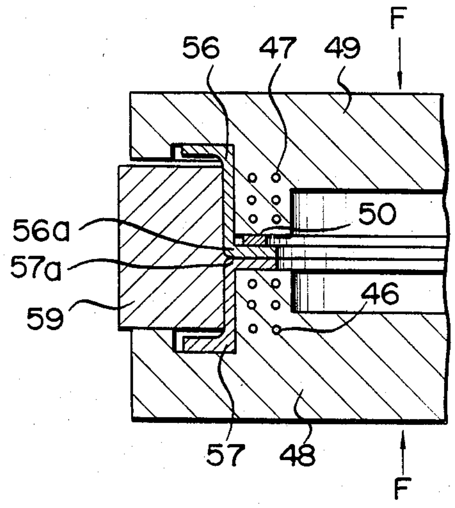
FIG. 13 is a sectional view illustrating an embodiment of the apparatus of FIG. 12.

In the embodiments illustrated in FIGS. 12 and 13, the body portion 25 of the vacuum container consists of a cylinder 55 composed of Al material of the vicinity of the input side 24 and integrated with portions of larger diameter and of smaller diameter; a middle Al ring 56 composed of Al material; an intermediate metal ring 57 composed of Fe material; a sealing ring 58 of Fe material capable of being readily airtightly joinable with glass or ceramic; and the glass or ceramic insulator 25*a* of the output portion. The intermediate Al ring 56 and the intermediate metal ring 57 of Fe material are bonded by applying heat and pressure through one or more layers of Ni, Cu or Al to flanges 56*a* and 57*a* folded so as to be in contact with the inner side of the tube at a plane perpendicular to the axis of the tube, as in the embodiments hereinbefore set forth. As shown in FIG. 13, both the flanges 56*a* and 57*a* are placed between the lower and upper press apparatuses 48 and 49, respectively, and are fixed by inserting a two-part hard metal ring 59 in order to prevent deformation of the outer periphery. They are then joined by applying heat and pressure. Then, both the outer peripheral portion 41 of the input window 24 and the flange 55*a* folded toward the outside of the cylinder 55, both made of Al material, are subjected to AC-TIG welding as shown by reference numeral 60. Both the lower flange 55*b* of the cylinder 55 and the flange 56*b* folded toward the outside of the intermediate Al ring 56 are also subjected to AC-TIG welding, as shown by reference numeral 61. The last step of closing the vacuum container in an airtight manner is to subject the middle metal ring 57 and the sealing ring 58, both made of Fe material, to AC-TIG welding at each of the outer flanges 57*b* and 58*a*, respectively, as shown by reference numeral 62. As this welding can be conducted outside the container using same materials, an airtight junction can be formed in a sure and easy manner.

The embodiment illustrated in FIG. 12 is characterized by forming the body constituting a portion of the vacuum container by airtightly joining it with rings of Al and Fe materials or other kinds of materials. This embodiment is applicable to a structure containing one or more sealed junctions of the Al material with the Fe material between the input window of Al material and the output portion insulator of glass or ceramic.

As mentioned hereinabove, the vacuum container of the present invention is formed by utilizing a hot pressure-bonding in connecting an input window of Al material, or a intermediate ring of another Al material to be joined to the input window, to a intermediate metal ring of Fe material to be airtightly joined to glass or ceramic, with one or more metal plated layers selected from the group consisting of Ni, Cu and Al formed on the surface of one or both of the Al material and the Fe material, thereby joining them in an airtight manner. Accordingly, the present invention can provide a sealed junction at a low cost and in a stable way so that it is suitable for mass production. As the hot pressure-bonding can be conducted by abutting a washer ring as a supplemental metal ring against Al material, the airtight junction can be formed in a surer way to realize a radiation image multiplier tube having a more practical application because it can reinforce relatively soft Al material.

What we claim is:

1. A method of manufacturing a vacuum container of a radiation image multiplier tube in which a member of Al or an Al alloy containing a radiation input window is airtightly joined to an insulation member of glass or ceramic containing an output portion for outputting radiation image multiplied signals through a first ring made of Fe or Fe alloy, wherein, in bonding the first ring with the member of Al or Al alloy, one or more thin layers of a metal selected from the group consisting of Ni, Cu and Al are previously formed by metal plating or deposition on a portion to be joined of the member of Al or Al alloy and/or a portion to be joined of the first ring, are superposed in planes perpendicular to the axis of the tube and are airtightly joined by hot pressure-bonding while applying pressure in the direction of the tube axis by means of a press apparatus in such a manner that said portion to be joined of the member Al or Al alloy is compressed and caused to be substantially thinner than its initial thickness by the hot pressure-bonding.

2. A method according to claim 1, wherein the junction is welded by heating at a temperature of 250° to 650° C. and applying a pressure of 250 to 1,500 $(kg \times 9.806)/cm^2$.

3. A method of manufacturing a vacuum container of a radiation image multiplier tube in which a first member of Al or an Al alloy containing a radiation input window is airtightly joined to an insulation member of glass or ceramic containing an output portion for outputting radiation image multiplied signals through a first ring of Fe of Fe alloy, said method comprising the steps of:

(a) depositing one or more thin layers of a metal selected from the group consisting of Ni, Cu and Al onto said ring and/or said first member in a joining region;

(b) superposing said ring and said first member at said joining region in planes perpendicular to the axis of the tube;

(c) superposing a washer ring with said first member so that said first member is disposed between said washer ring and said first ring, said washer ring being in registry with said joining region and constructed of a material having a hardness substantially similar to the material of said first ring;

(d) forming an airtight seal between said first ring and said first member by positioning the joining region between a press apparatus and applying pressure to the joining region in the direction of the tube axis to thereby hot-pressure bond said first ring and first member at said joining region, said application of pressure causing the first member to become substantially thinner than its initial thickness; and (e) releasing the pressure applied according to step (d), said washer ring preventing attachment of said first member to said pressing apparatus upon release of the applied pressure.

4. A method of manufacturing a vacuum container of a radiation image multiplier tube in which a first member of Al or an Al alloy containing radiation input window is airtightly joined to an insulation member of glass or ceramic containing an output portion for outputting radiation image multiplied signals through a first ring of Fe or Fe alloy, said method comprising the steps of:

(a) depositing one or more thin layers of a metal selected from the group consisting of Ni, Cu and Al onto said ring and/or said first member in a joining region;

(b) superposing said ring and said first member at said joining region in planes perpendicular to the axis of the tube;

(c) forming an airtight seal between said first ring and said first member by positioning the superposed ring and first member between a pressing apparatus and applying pressure to said joining region to deform said first member and thus hot-pressure bond said first member to said ring; and wherein prior to step (c) there is practiced the step of preventing attachment of said first member to said pressing apparatus by superposing a washer ring with said first member in registry with said joining region.

* * * * *